(12) United States Patent
Peterson et al.

(10) Patent No.: US 12,071,098 B2
(45) Date of Patent: Aug. 27, 2024

(54) VEHICLE DOOR HANDLE WITH MULTI-FUNCTION SENSING SYSTEM

(71) Applicant: Magna Mirrors of America, Inc., Holland, MI (US)

(72) Inventors: Eric Peterson, West Olive, MI (US); Kevin M. Wright, Lansing, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 276 days.

(21) Appl. No.: 17/652,110

(22) Filed: Feb. 23, 2022

(65) Prior Publication Data
US 2022/0266796 A1 Aug. 25, 2022

Related U.S. Application Data

(60) Provisional application No. 63/261,366, filed on Sep. 20, 2021, provisional application No. 63/200,220, filed on Feb. 23, 2021.

(51) Int. Cl.
| | |
|---|---|
| *B60R 25/20* | (2013.01) |
| *B60H 1/00* | (2006.01) |
| *B60Q 3/217* | (2017.01) |
| *B60R 25/01* | (2013.01) |
| *E05B 81/76* | (2014.01) |
| *E05F 15/73* | (2015.01) |
| *G06F 3/01* | (2006.01) |
| *G06F 3/0354* | (2013.01) |

(52) U.S. Cl.
CPC ..... *B60R 25/2045* (2013.01); *B60H 1/00742* (2013.01); *B60Q 3/217* (2017.02); *B60R 25/01* (2013.01); *E05B 81/77* (2013.01); *E05F 15/73* (2015.01); *E05Y 2400/44* (2013.01); *E05Y 2400/86* (2013.01); *E05Y 2900/531* (2013.01); *E05Y 2900/55* (2013.01); *G06F 3/017* (2013.01); *G06F 3/03547* (2013.01)

(58) Field of Classification Search
CPC ............... B60R 25/2045; B60R 25/01; B60R 21/01552; E05F 15/73; E05F 2015/765; E05F 2015/767; B60Q 3/217; B60H 1/00742; E05B 81/77; G06F 3/017
See application file for complete search history.

(56) References Cited

U.S. PATENT DOCUMENTS

| | | |
|---|---|---|
| 5,371,659 A | 12/1994 | Pastrick et al. |
| 5,497,305 A | 3/1996 | Pastrick et al. |

(Continued)

*Primary Examiner* — Jacob M Amick
(74) *Attorney, Agent, or Firm* — HONIGMAN LLP

(57) ABSTRACT

A vehicular sensing system includes a sensing device disposed at a vehicle door of a vehicle. The sensing device includes a sensor element and at least one light emitting diode (LED) disposed at a circuit board. The sensing device is disposed behind a panel of the vehicle door of the vehicle, with the sensor element and the at least one LED being disposed at a light transmitting portion of the panel of the vehicle. The vehicular sensing system, responsive to processing at the controller of captured sensor data when the sensor element and the at least one LED are powered, determines a user input corresponding to a particular location and movement of a user's hand at or near the sensing device. The vehicular sensing system, responsive to determining a particular user input of a plurality of user inputs, provides an output.

19 Claims, 17 Drawing Sheets

(56) References Cited

U.S. PATENT DOCUMENTS

| | | |
|---|---|---|
| 5,669,699 A | 9/1997 | Pastrick et al. |
| 5,823,654 A | 10/1998 | Pastrick et al. |
| 6,349,450 B1 | 2/2002 | Koops et al. |
| 6,550,103 B2 | 4/2003 | Koops et al. |
| 6,907,643 B2 | 6/2005 | Koops et al. |
| 7,407,203 B2 | 8/2008 | Huizenga et al. |
| 8,333,492 B2 | 12/2012 | Dingman et al. |
| 8,786,401 B2 | 7/2014 | Sobecki et al. |
| 8,801,245 B2 | 8/2014 | De Wind et al. |
| 9,925,953 B2 | 3/2018 | Pribisic et al. |
| 10,107,026 B2 | 10/2018 | Dezorzi et al. |
| 10,533,350 B2 | 1/2020 | Schatz et al. |
| 10,559,153 B2 | 2/2020 | Snider et al. |
| 10,569,697 B2 | 2/2020 | Huizen et al. |
| 2010/0007463 A1 | 1/2010 | Dingman et al. |
| 2010/0088855 A1 | 4/2010 | Ruse et al. |
| 2015/0325066 A1* | 11/2015 | Müller .................... E05B 81/78 340/5.61 |
| 2018/0094471 A1 | 4/2018 | Mitchell |
| 2020/0130646 A1 | 4/2020 | Peterson |
| 2020/0232262 A1* | 7/2020 | Marlia .................... B60R 25/01 |
| 2021/0293061 A1 | 9/2021 | Blank et al. |
| 2023/0089000 A1 | 3/2023 | Peterson |

* cited by examiner

| Item | Description |
|---|---|
| 1 | PCB |
| 2 | IR LED |
| 3 | IR Sensor Array |
| 4 | Microcontroller |
| 5 | 3.3v Power Supply |
| 6 | LIN Transceiver |
| 7 | Connector |
| 8 | Optical Barrier |
| 9 | Harness |
| 10 | Housing |
| 11 | Potting |

- Proximity
  - Presence
  - Distance
- Tracking
  - Region (4x3)
  - Distance
- Gesture
  - Swipe
  - Rotation
  - 'Click'

VEHICLE DOOR HANDLE WITH MULTI-FUNCTION SENSING SYSTEM

CROSS REFERENCE TO RELATED APPLICATIONS

The present application claims the filing benefits of U.S. provisional application Ser. No. 63/261,366, file Sep. 20, 2021, and U.S. provisional application Ser. No. 63/200,220, filed Feb. 23, 2021, which are hereby incorporated herein by reference in their entireties.

FIELD OF THE INVENTION

The present invention relates to sensing systems or modules for vehicles and, more particularly, to a sensing system or module for an exterior door handle of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door.

SUMMARY OF THE INVENTION

Implementations herein provide a vehicular sensing system that includes a sensing device disposed at a vehicle door of a vehicle equipped with the vehicular sensing system. The sensing device includes a sensor element and at least one light emitting diode (LED) disposed at a circuit board. The sensing device is disposed behind a panel of the vehicle door of the vehicle with the sensor element and the at least one LED being disposed at a light transmitting portion of the panel of the vehicle door of the vehicle. The system includes a controller including circuitry that includes a processor operable to process sensor data captured by the sensor element. The vehicular sensing system, responsive to processing at the controller of sensor data captured by the sensor element when the sensor element and the at least one LED are powered, determines a user gesture corresponding to a particular movement of a hand of a user relative to the sensing device. The vehicular sensing system is operable to determine any one of a plurality of user gestures based on determination of one or more selected from the group consisting of (i) a particular location of the user's hand relative to the sensing device, (ii) swiping movement of the user's hand relative to the sensing device, (iii) circular movement of the user's hand relative to the sensing device, (iv) movement of the user's hand toward or away from the sensing device, and (v) a linger time of the user's hand at the particular location relative to the sensing device. The vehicular sensing system, responsive to determining a particular user gesture of the plurality of user gestures, provides an output for at least one selected from the group consisting of (i) locking the vehicle door of the vehicle, (ii) unlocking the vehicle door, (iii) opening the vehicle door, (iv) opening or closing a window of the vehicle, (v) folding/unfolding powerfold mirrors of the vehicle, (vi) interfacing with HVAC functions of the vehicle, (vii) interfacing with infotainment functions of the vehicle, (viii) triggering a home garage door opener, (ix) activating/deactivating exterior lighting of the vehicle, (x) activating a car wash function of the vehicle and (xi) activating a panic mode of the vehicle.

These and other objects, advantages, purposes and features of the present invention will become apparent upon review of the following specification in conjunction with the drawings.

DESCRIPTION OF THE PREFERRED EMBODIMENTS

Figure 1:
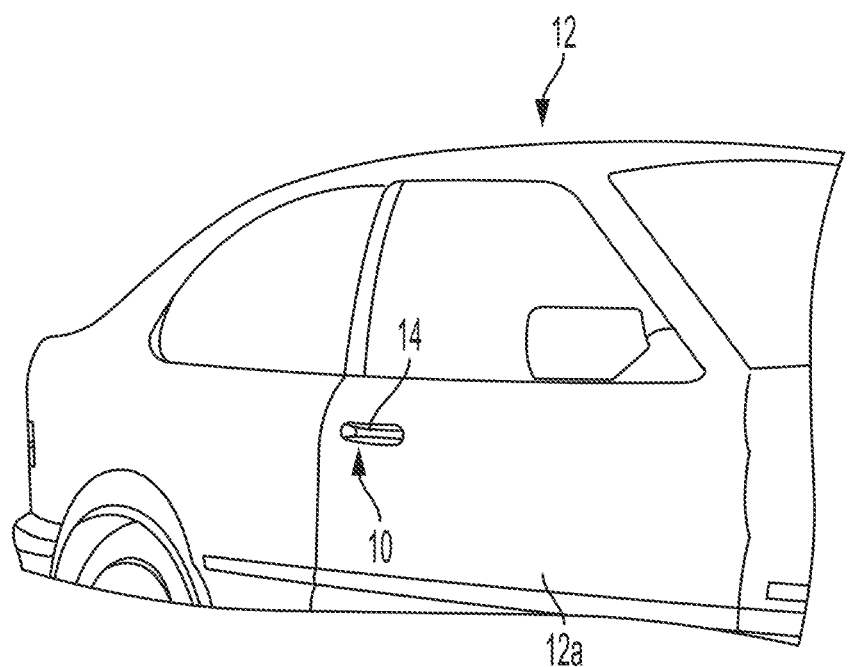
FIG. 1 is a perspective view of a vehicle with a sensor system.

Referring now to the drawings and the illustrative embodiments depicted therein, a vehicle door handle assembly 10 is mountable to a door 12*a* of a vehicle 12 and operable to release a latch mechanism (not shown) of the door 12*a* to open the vehicle door (FIG. 1). Vehicle door handle assembly 10 includes a handle portion 14 that is disposed at the door and that is fixedly mounted at the door or to a bracket mounted to the door.

The door handle assembly includes a sensing module that is operable to detect or sense a user's hand at the door handle. When actuated, the sensing module may unlock (or lock) and/or open the door, and may also provide other outputs for controlling other functions of the door and/or vehicle. The door handle assembly and module may utilize aspects of the assemblies and modules described in U.S. Pat. Nos. 10,569,697; 10,533,350; 10,107,026 and/or 9,925,953, and/or U.S. Publication Nos. US-2021-0293061 and/or US-2020-0130646, which are hereby incorporated herein by reference in their entireties. The sensing module may be disposed at the door handle assembly or elsewhere at the vehicle door or side or rear of the vehicle. The sensing module may include a controller or microcontroller, or a separate controller may be responsive to the sensor module, with the separate controller being disposed in the vehicle or at the vehicle door (e.g., at the door control module or the like).

Beyond the standard mechanical cable, many door handles also have inputs for locking, unlocking, and/or opening the door. The current standard for triggering the authentication process and unlock, or the lock function, is a simple touch or grab of a capacitive sensor located in the door handle. E-latch type handles may also use a mechanical release switch to provide additional protection against false activations, as an e-latch triggers the opening of the door, rather than just an unlock.

Beyond a more robust determination of the operator's intent for e-latch situations, alternative input methods may also be used to activate other vehicle features. For example, additional inputs (either via the same door handle lock/unlock sensor or other sensor or human machine interface (HMI) at the vehicle door) may be actuated to provide one or more of the following functions:

- Locking or unlocking a single door or all of the doors of the vehicle;
- Enabling a secondary lock mode (deadbolt) or alarm system of the vehicle;
- Unlocking or opening a gas door, charging port, rear hatch, or trunk of the vehicle;
- Opening or closing windows, sunroofs, moon roofs, or vents of the vehicle;
- Activating the HVAC or radio before entering the vehicle;
- Triggering a valet mode (limited vehicle/range functionality), long-park mode (low power) of the vehicle;
- Triggering a car-wash mode of the vehicle (which may close all windows, de-sensitize touch sensors, latches, and other inputs of the vehicle that could easily open the vehicle and expose it to the elements, and which may deactivate rain sensing wipers of the vehicle);
- Activating a panic mode (horns/lights) of the vehicle;
- Turning on exterior lighting of the vehicle (headlights/auxiliary lighting/parking lights/hazard lights);
- Folding/unfolding powerfold side exterior mirrors of the vehicle;
- Initiating auto-valet functions (self-parking) or auto-park functions of the vehicle (such as, for example, initiating a backing out maneuver of the vehicle out of a narrow garage);
- Triggering garage door opener or home automation functions; and/or
- Initiating an interior self-cleaning routine (UV, ozone, chemical, etc.) by locking the vehicle for a set amount of time (useful for ride-share, rental, or fleet vehicles).

The additional input methods or systems or means may vary based on the technology used, but include an additional action including but not limited to a duration of presence or touch, location of presence or touch, motion of presence or touch, or a combination thereof.

Capacitive touch sensing (such as via sensors and/or systems of the types described in U.S. Publication No. US-2021-0293061, which is hereby incorporated herein by reference in its entirety) may be expanded by adding various input detections. For example, a capacitive touch sensor may detect various motions or positions of a user's hand and may generate a different output (that may control or operate the same function in a different manner or a different vehicle function altogether) based on the particular position and/or motion detected. Such motions or positions that the sensor may detect may include:

- Hold (e.g., for 2-10 seconds, depending on severity of function triggering);
- Swipe (using motion across discrete pads or an interleaved slide sensor);
- two dimensional (2-D) keypad input pattern (e.g., a phone lock screen);
- one dimensional (1-D) proximity sensing (IR (infra-Red), ultrasonic, radar, ToF (Time of Flight), etc.);
- Air click (move hand towards and then away from sensor);
- Presence detection (where the user's hand remain near the sensor for a defined amount of time);
- Distance from sensor (detect distance from sensor, with different distances being associated with different outputs or control functions);
- Proximity hold (remain at a constant distance from sensor);
- Swipe up, down, left, or right;
- Clockwise or counterclockwise rotation;
- Positional/Gesture sensing (IR (infra-Red), Radar, ToF (Time of Flight), Camera, etc.);
- All 1-D proximity sensing input methods;
- 2-D gestures such as up, down, left, right, and rotation (move near sensor in specified method); and/or
- Proximity hold and position (remain at a constant distance from sensor in a specified area).

Thus, the handle assembly may include one or more sensors or sensor modules that detect various motions or positions of, for example, a user's hand or arm, at or near the vehicle door. The sensor or system determines the particular location or motion (or time duration at a location) and provides the respective output, such as to a door control module or electronic control module of the vehicle, which controls the particular vehicular function or feature associated with that output.

Figure 2:
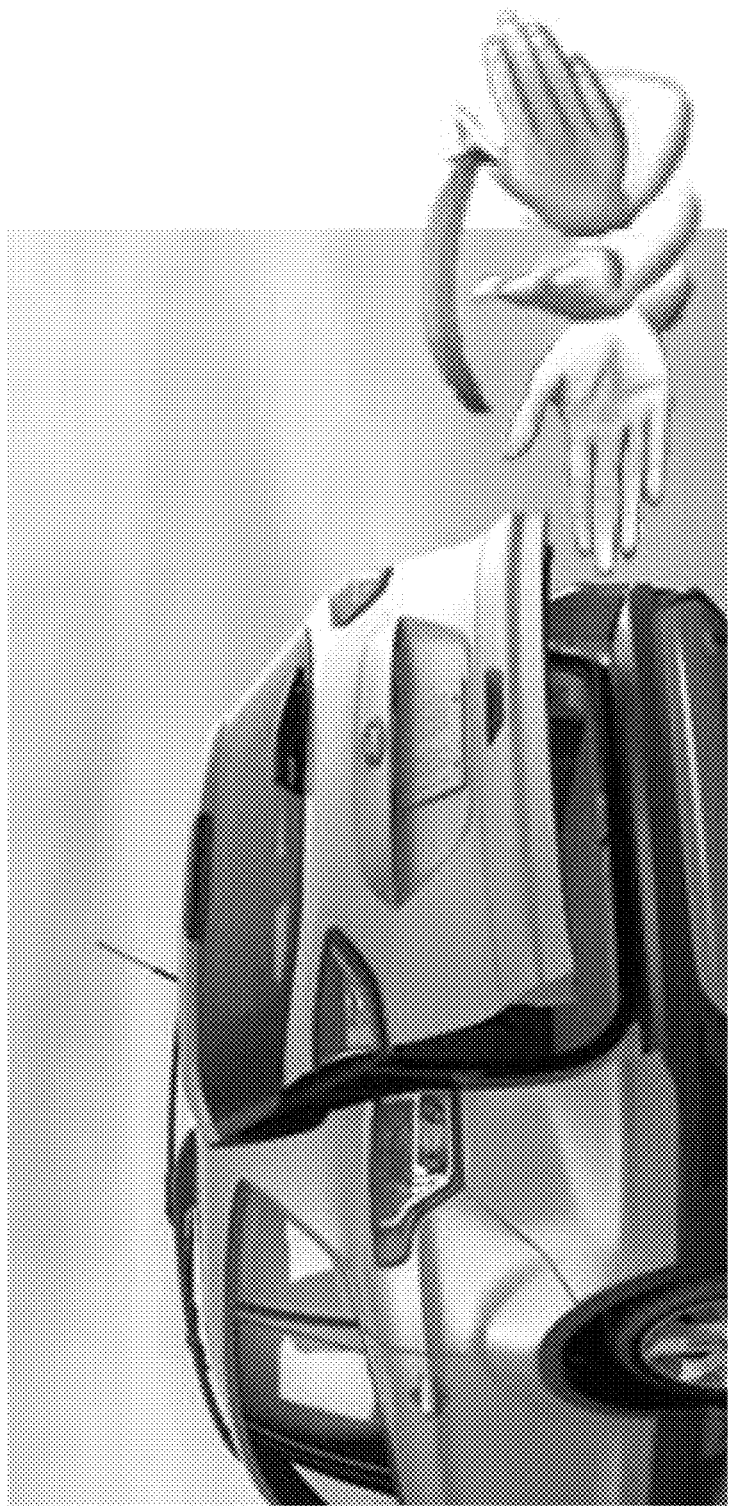
FIG. 2 is a perspective view of a rear liftgate of a vehicle, showing various hand motions detectable by the sensor system.

As shown in FIG. 2, the sensing system provides non-contact gesture and proximity sensing, such as for opening and locking a tailgate or liftgate of the vehicle. The system provides a non-contact option for access control with the module located in the handle or applique. The sensing device or module provides for gesture recognition with an intuitive interface, with the gestures including, for example, proximity, linger time, swipe direction, rotation, and virtual click (moving a hand or finger toward the sensor).

Figure 3:
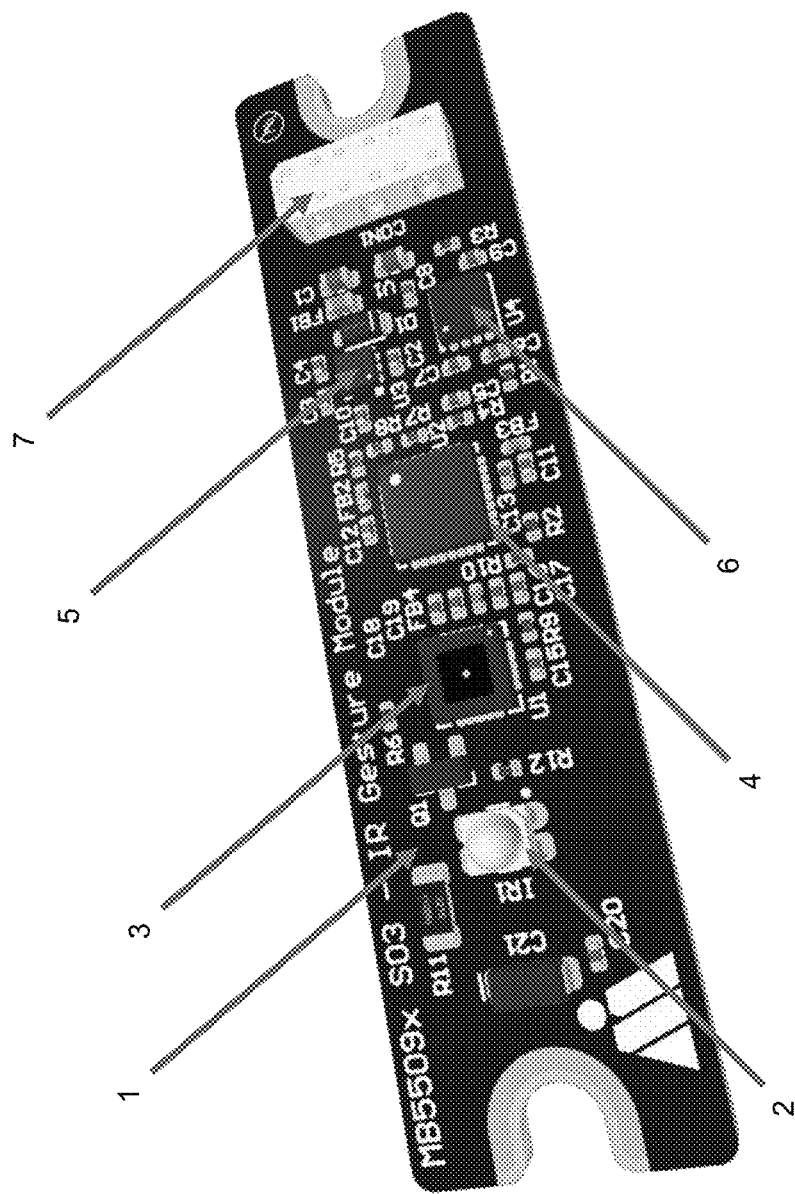
FIG. 3 is a perspective view of a sensor circuit board for the sensor system.
Figure 4:
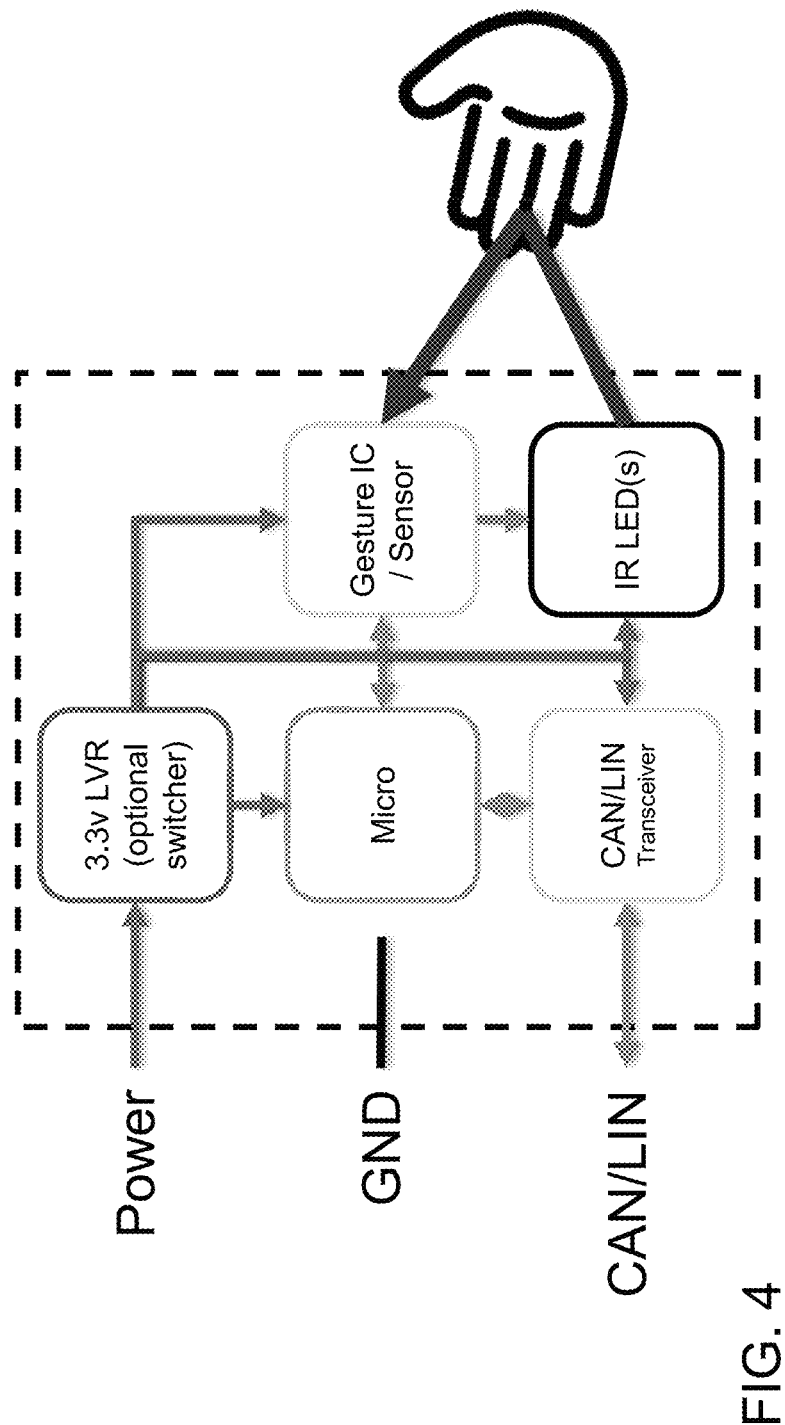
FIG. 4 is a block diagram of the sensor device.

The sensing module comprises an infrared or near infrared light emitting diode and a sensing element disposed at a circuit board (FIGS. 3 and 4). The system can provide for a hands-free method to open and lock vehicle closures, such as doors, power liftgates, power release tailgates and/or power side doors.

Figure 5:
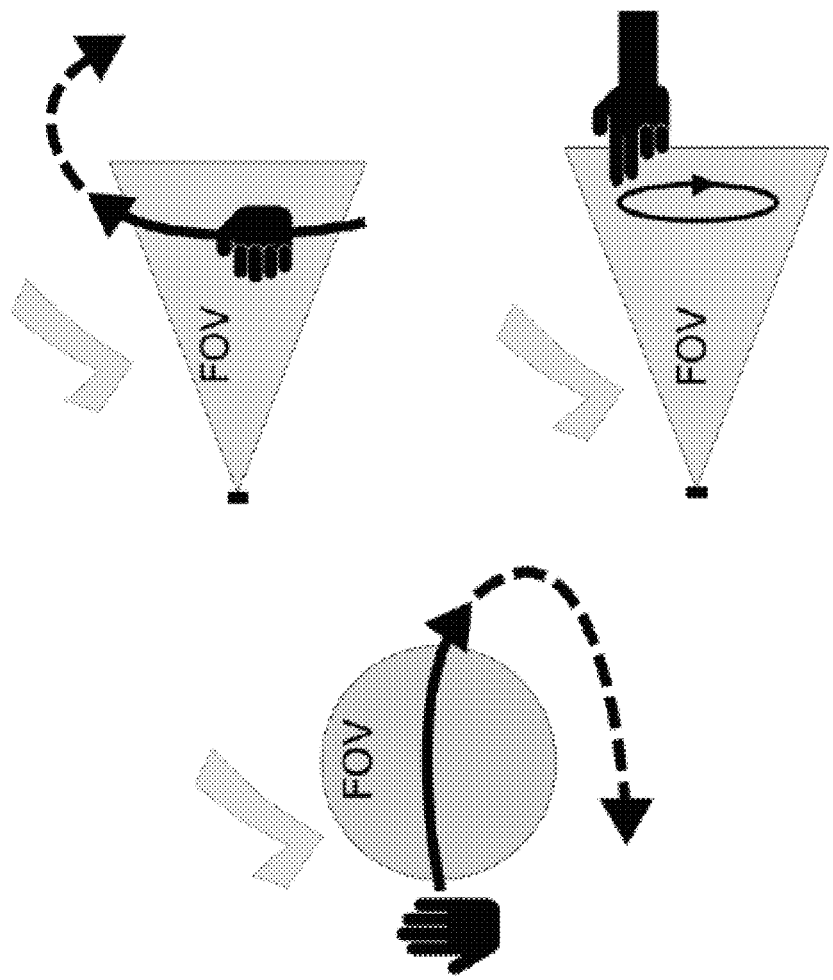
FIGS. 5-7 show various gestures or hand movements that can be sensed by the sensor system.
Figure 6:
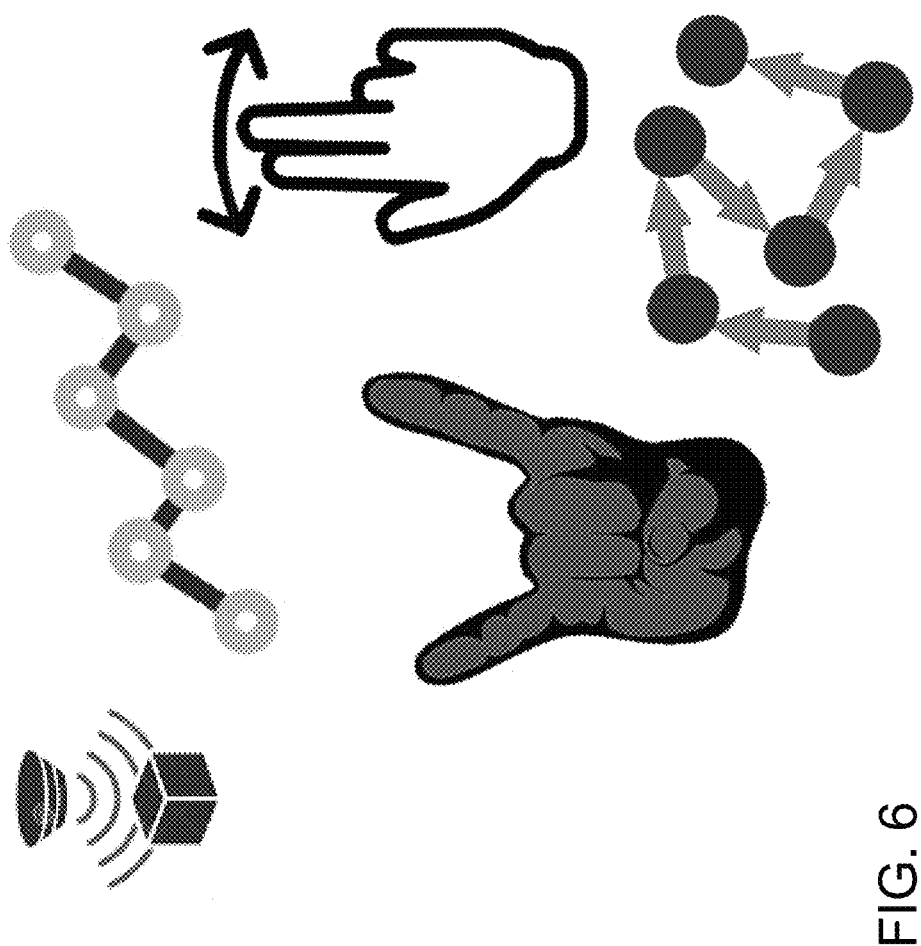
Figure 7:
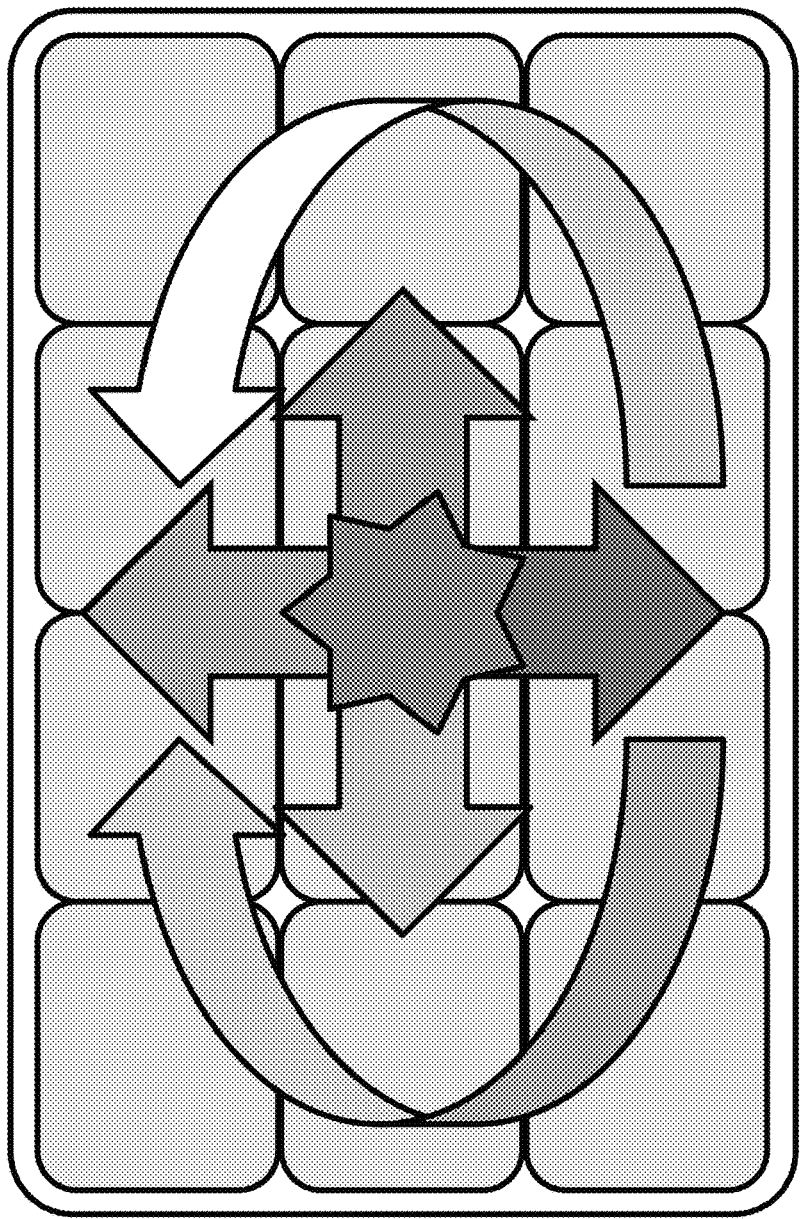

Different motions or gestures (see FIGS. 5-7) may be sensed to provide or control additional functions, such as window roll-down/up, exterior auxiliary lighting and multi-function tailgate features or the like. Thus, the system may sense proximity of the user's hand, arm, leg, foot, or other target, and may detect presence of the target in front of the sensor, duration of presence of the target, distance between the sensor and the target, and a change in distance between the sensor and the target. The system may track the position of the target in front of the sensor, and all proximity functions may be localized to a single sensing region. The system may determine various gestures, such as swipe up, down, left, right, rotate clockwise, counter-clockwise, and click. The system may determine the hand position and shape, such as an open hand, a pointing finger(s), a thumb-to-index finger, a "peace sign" and/or any combination of the determined positions and movements and distances, etc. For example, the system may determine a sequence of gestures, such as clockwise movement, followed by counter-clockwise movement and/or linear sideward (or up/down) movement and then a click motion. The system may recognize arm positions (or portions of an arm) or angles. For example, if the user's hands are full, the system may recognize, for example, a swipe of an elbow in front of the sensor. The system may recognize various gestures for different functions and may recognize gestures that include one or more movements (e.g., swipe, rotation, hand/finger position) followed by a virtual click motion. The system may provide a display or indicator that indicates to the user that the motion was recognized and that the associated function is being performed (particularly for functions that are not readily apparent to the user exterior of the vehicle). For example, the system provides a visual indication (e.g., illuminating one or more LEDs) or an audible indication (e.g., a beep, chime, or click).

Figures 8, 9:
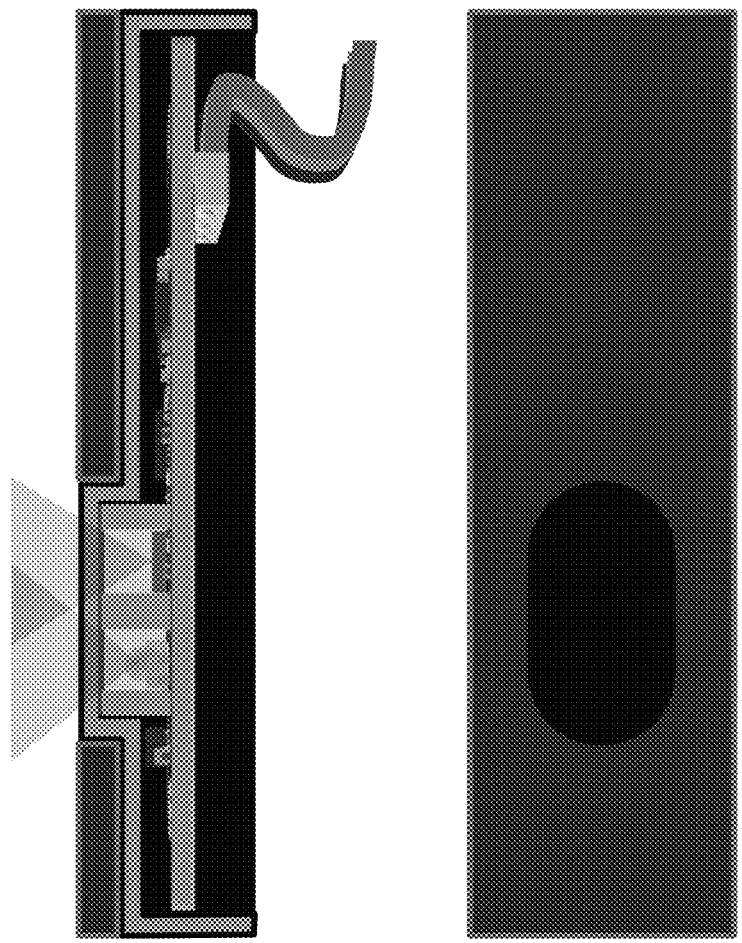
FIGS. 8 and 9 show the sensor device disposed at a class-A element of the vehicle and sensing through a light transmitting window through the class-A element and surface.

The circuit board of the sensing device may be disposed within the door handle or applique at the closure or door, and the class-A surface or part may have a light transmissive portion or window (such as a small window of less than around 20 mm×12 mm or thereabouts) at the LED and sensor elements (see FIGS. 8 and 9). The sensor may include a protrusion through the class-A outer part of the closure at the sensor area. The IR material may comprise a single piece or may be a two-shot construction. A silicone or foam gasket may be used as an optical barrier and potting material. The sensor may be fully potted except at the optical area.

Figure 10:
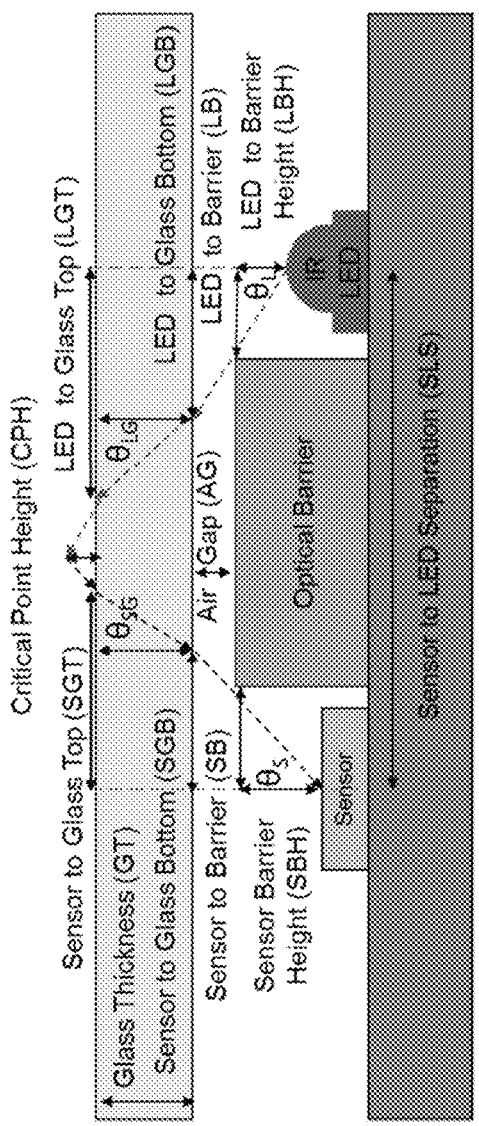
FIG. 10 shows various design parameters for the sensor device.

The sensing device has the sensor element and the IR LED spaced apart on the circuit board to provide the desired sensing (see FIG. 10). The sensing device may include an optical barrier between the sensor element and the LED. The design parameters are used to calculate the critical point height, as well as the horizontal distance between FOVs at the cover surface. FIG. 10 shows exemplary values for the sensing device design parameters.

Figure 11:
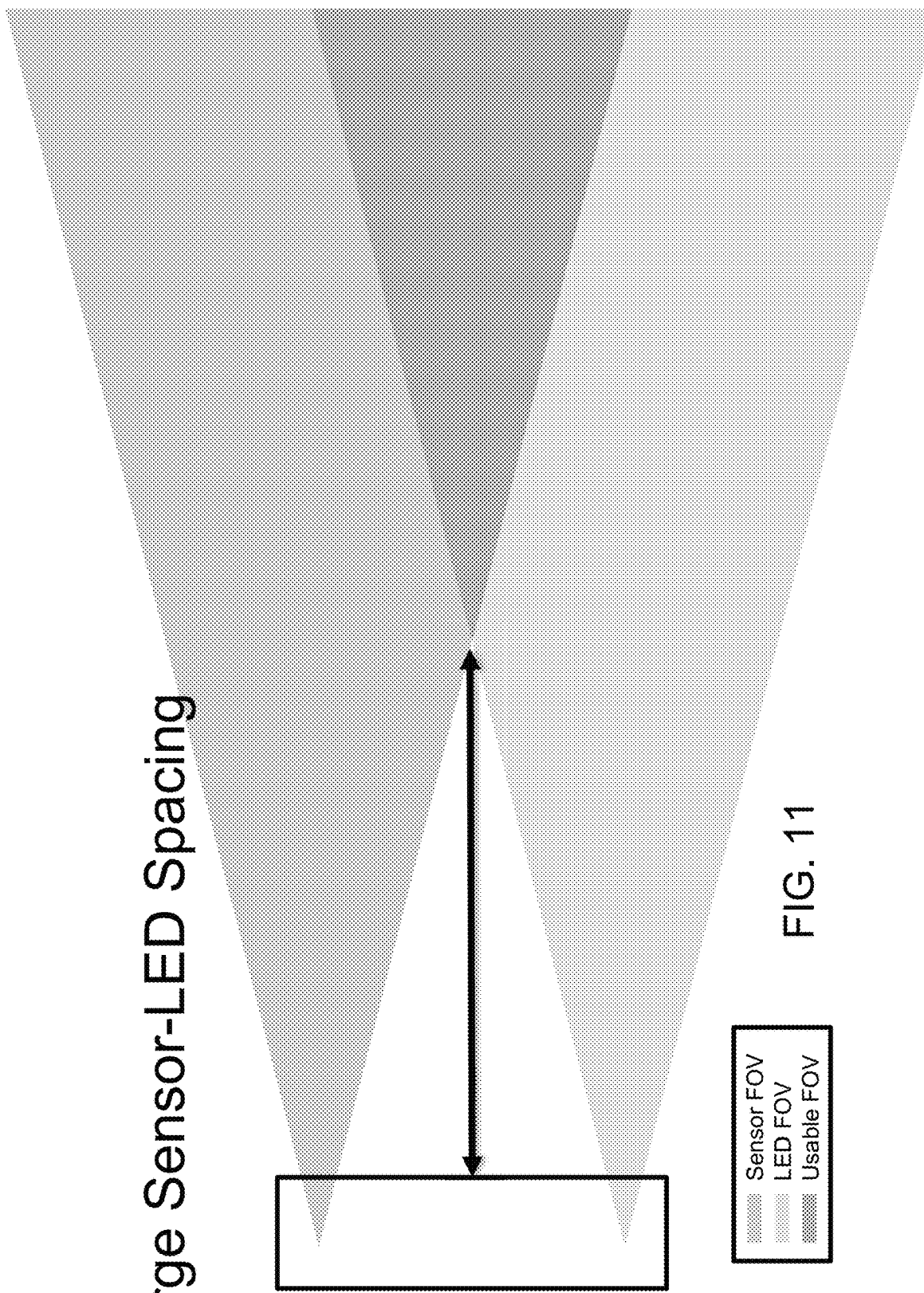
FIGS. 11-13 show the fields of sensing of the sensor device with different sensor-LED spacing.
Figure 12:
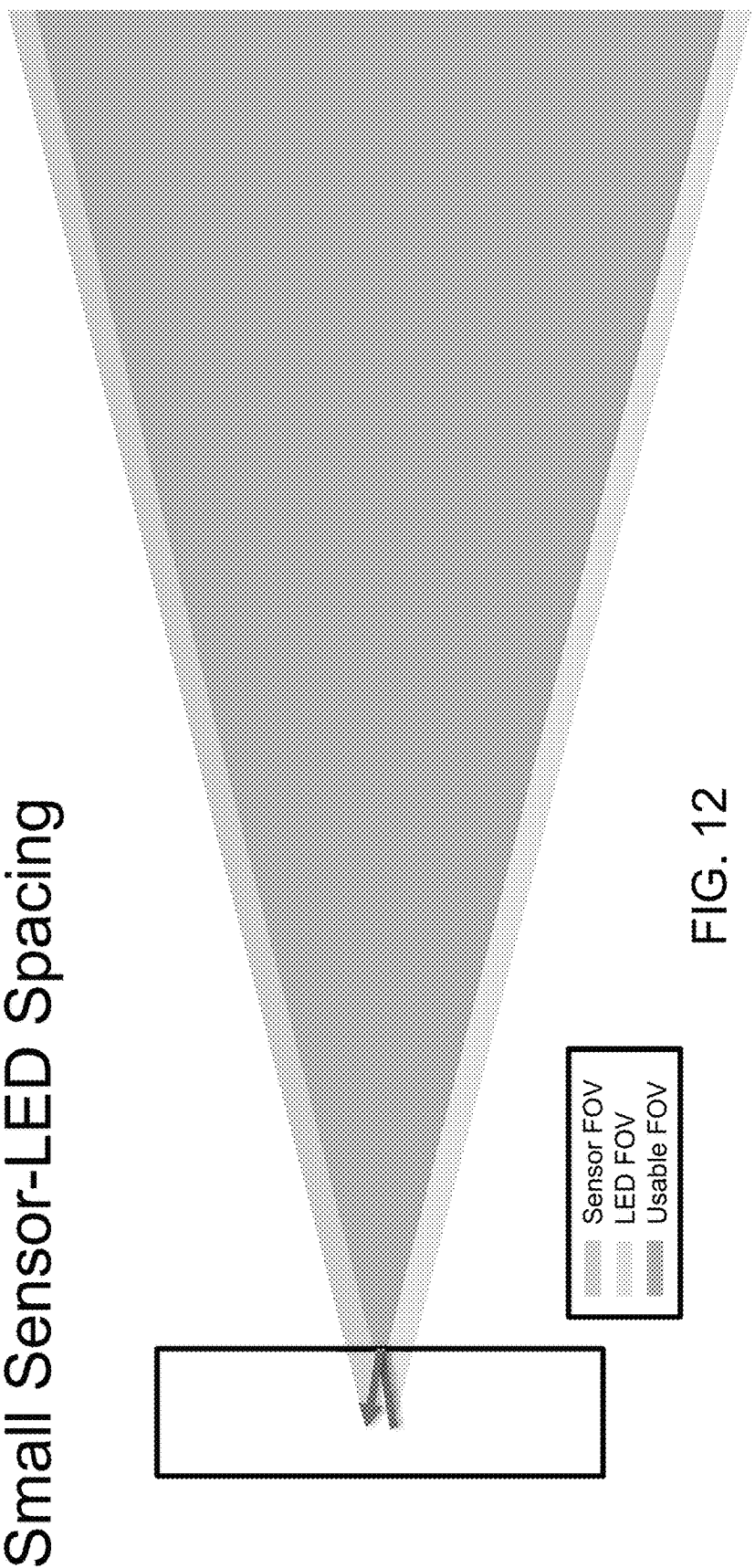
Figure 13:
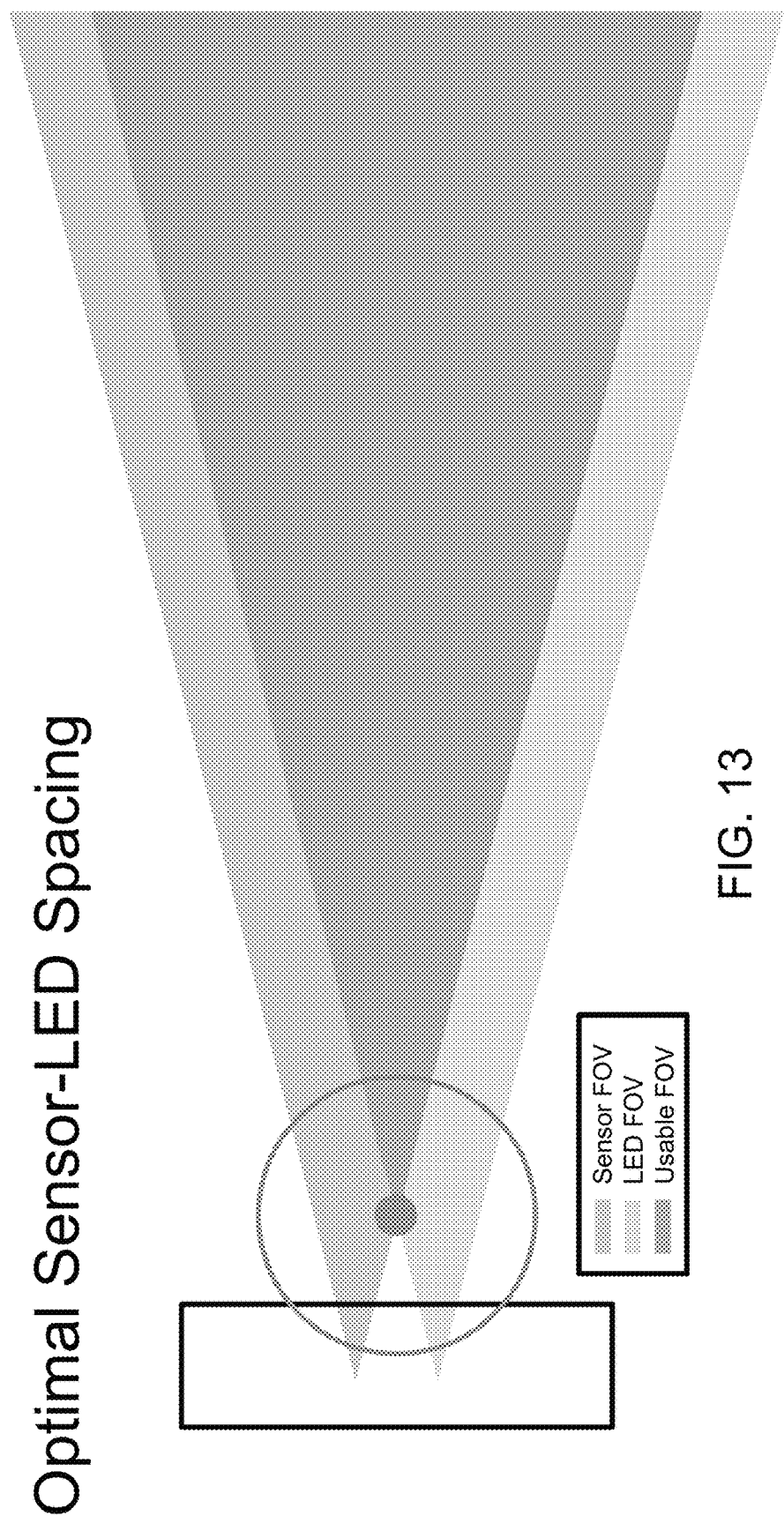
Figure 14:
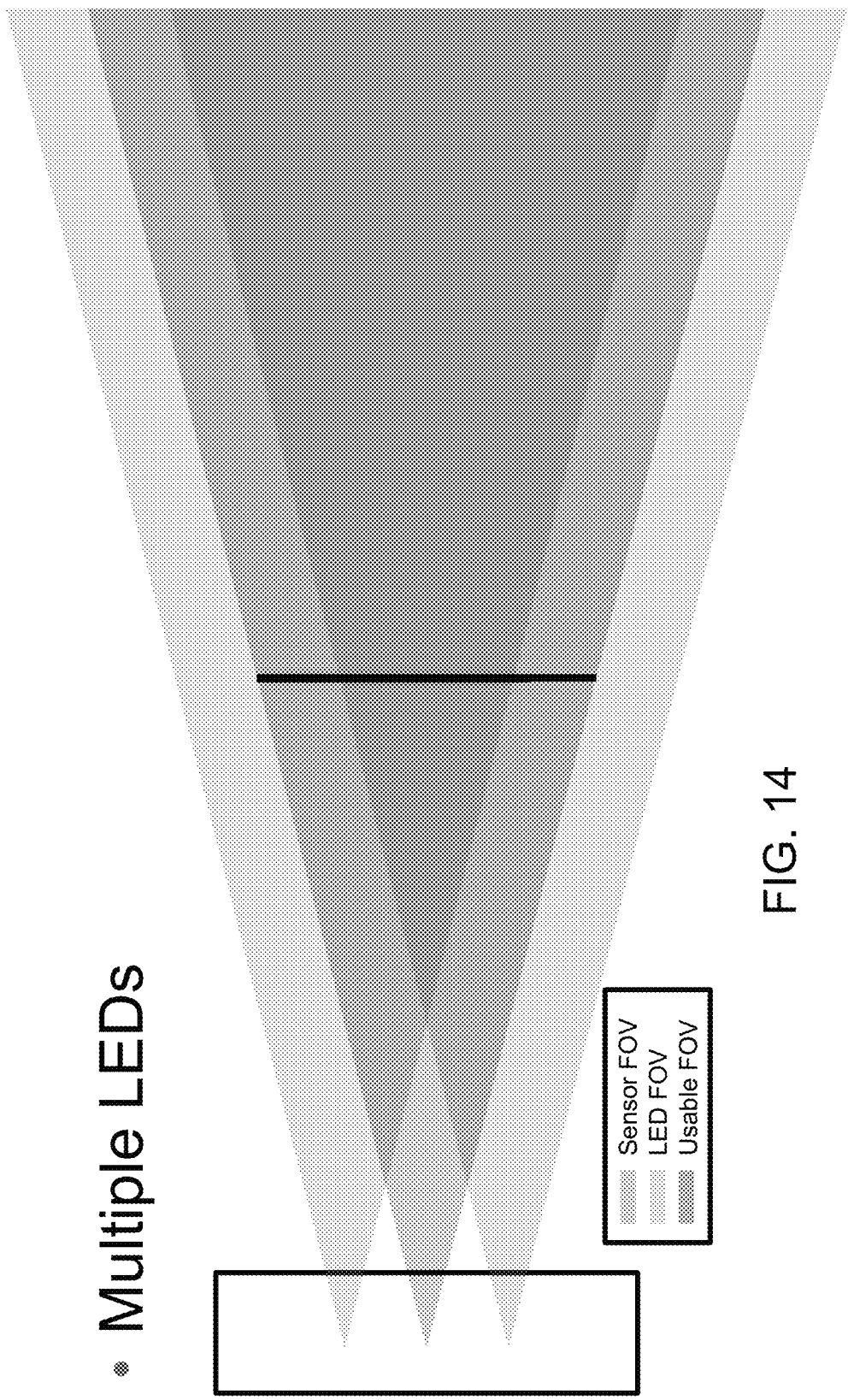
FIG. 14 shows a sensor device with two LEDs and one sensor element.

As shown in FIGS. 11-13, the sensor may provide different sensing regions, depending on the particular application. For example, a large sensor-LED spacing (FIG. 11) may limit how close the target can be sensed and tracked, while a very close or small sensor-LED spacing (FIG. 12) may result in internal reflections that may inhibit proper function. As shown in FIG. 13, the sensor and LED should be spaced apart a sufficient amount so that the closest sensing point is outside of the class-A surface but close enough to ensure adequate field of view when close to the sensor. Optionally, as shown in FIG. 14, multiple LEDs may be used to increase the size of the sensing area and to increase uniformity of illumination at the sensing region.

The sensing device may operate to determine various gestures and may control or provide a particular function for each recognized gesture. For example, the system may provide for locking, unlocking, or opening doors, liftgate, tailgate, trunk, gas door, or charging port, opening or closing windows, sunroofs, moon roofs, or vents, folding/unfolding powerfold mirrors, interfacing with HVAC or infotainment functions from outside the vehicle, triggering home automation functions such as garage door opener, activating/deactivating exterior lighting such as auxiliary lighting, parking lights, or hazard lights, initiating self-parking or auto valet functions, triggering alternate vehicle modes such as long-term parking, car-wash, or limited-range, and/or initiating an interior self-cleaning routine (UV, ozone, chemical, etc.) by locking the vehicle for a set amount of time (useful for ride-share, rental, or fleet vehicles).

The sensor device may utilize various sensing means to determine the hand position, gesture, proximity, etc., such as, for example, time of flight sensing, radar, ultrasonic and/or capacitive sensing. Preferably, the sensor device comprises an IR sensor array that can detect gesture, proximity, etc. via a small sensor package that can be packaged within a door handle or the like. The sensor device may have a sensing range of at least 200 mm, such as at least 250 mm or at least 300 mm.

The sensor device may operate in various power modes, such as a sleep mode (where it is episodically sensing to determine presence of a target or approach of, for example, a key fob or mobile device or other indication that an authorized user is nearby), a lower power mode and a normal power mode. The ECU may set the sensor device to the appropriate mode, and may switch to feature activation to determine and track a target. The sensor status (idle, gesture, rotation) may be communicated to the ECU, and when a target is sensed and tracked, the gesture results (e.g., click, rotation, swipe, etc.) are communicated to the ECU, along with the tracking position of the target (e.g., the column, row and distance in the sensing region).

The sensor device may be disposed at a door handle assembly of the vehicle door. The door handle assembly may comprise any suitable type of door handle assembly, and may include or incorporate aspects of the door handle assemblies and lighting devices described in U.S. Pat. Nos. 6,349,450; 6,550,103; 6,907,643; 7,407,203; 8,333,492; 8,786,401 and/or 8,801,245, and/or U.S. Publication Nos. US-2010-0088855 and/or US-2010-0007463, which are hereby incorporated herein by reference in their entireties. Although shown as a strap type handle, the handle assembly may comprise any suitable type of vehicle door handle assembly, such as a paddle type vehicle door handle assembly (having a paddle or the like that may be pulled at to open the vehicle door) or other type of vehicle door handle assembly. Optionally, the door handle assembly may comprise a flush door handle assembly (such as of the types described in U.S. Pat. No. 8,786,401, which is hereby incorporated herein by reference in its entirety), whereby the lighting module may actuate to illuminate the handle portion and may emit light through the handle portion or around the handle portion. Optionally, the door handle assembly may include a soft touch handle portion, such as utilizing the principles described in U.S. Pat. Nos. 6,349,450; 6,550,103 and/or 6,907,643, which are hereby incorporated herein by reference in their entireties.

Figure 15:
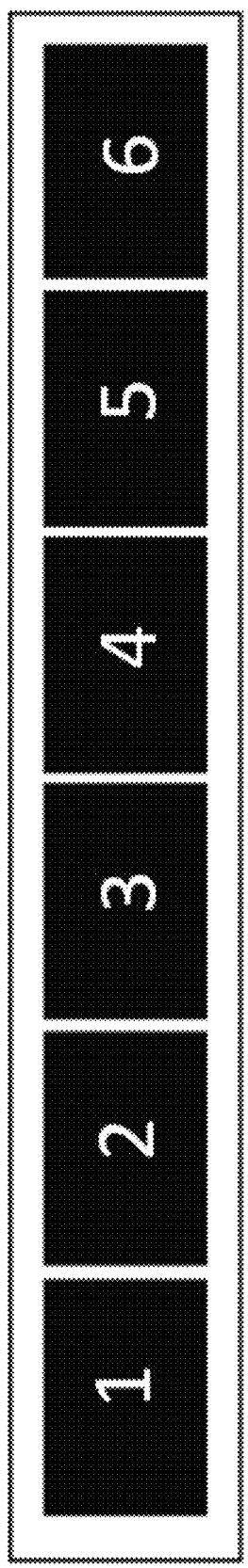
FIG. 15 shows a touch pad region comprising six separate touch pad sensors.

Referring now to FIG. 15, optionally, the door handle assembly includes a touch pad or touch region for registering touches, swipes, and gestures from a user. The touch pad may comprise a plurality of capacitive touch pads (e.g., two touch pads, four touch pads, six touch pads, etc.) that designate one or more touch regions for the user to touch to provide input to the system (e.g., taps, holds, swipes, etc.). The touch pads may be linearly arranged, as shown in FIG. 15, or may be disposed in any other manner (e.g., in a grid).

Each touch pad (e.g., touch sensor) may register or detect when a user touches the respective touch pad (e.g., based on an amount of capacitance or charge measured by the touch pad). The system may determine an order the touch pads are activated in to determine a gesture performed by the user. An activation of a threshold number of touch pads in a sequential order (e.g., three touch pads in a sequential order) may be detected as a "swipe" gesture. For example, when touch pad '2' is activated (FIG. 15), followed by the activation of touch pad '3,' which is followed by the activation of touch pad '4,' the system may determine that the user has performed a swipe gesture from left to right (i.e., from touch pad '1' to touch pad '6'). When less than the threshold number of touchpads is activated, the system may determine the user did not perform a swipe gesture to reduce false positive detections. The system may detect a swipe gesture in any direction that follows a sequential activation of touch pads (e.g., left to right, right to left, vertically, or diagonally). Responsive to determining that a swipe gesture has occurred and a direction and/or magnitude of the swipe, the system may control a function of the vehicle (e.g., lock or unlock the doors, roll windows down or up, close or open the trunk, etc.).

Figure 16:
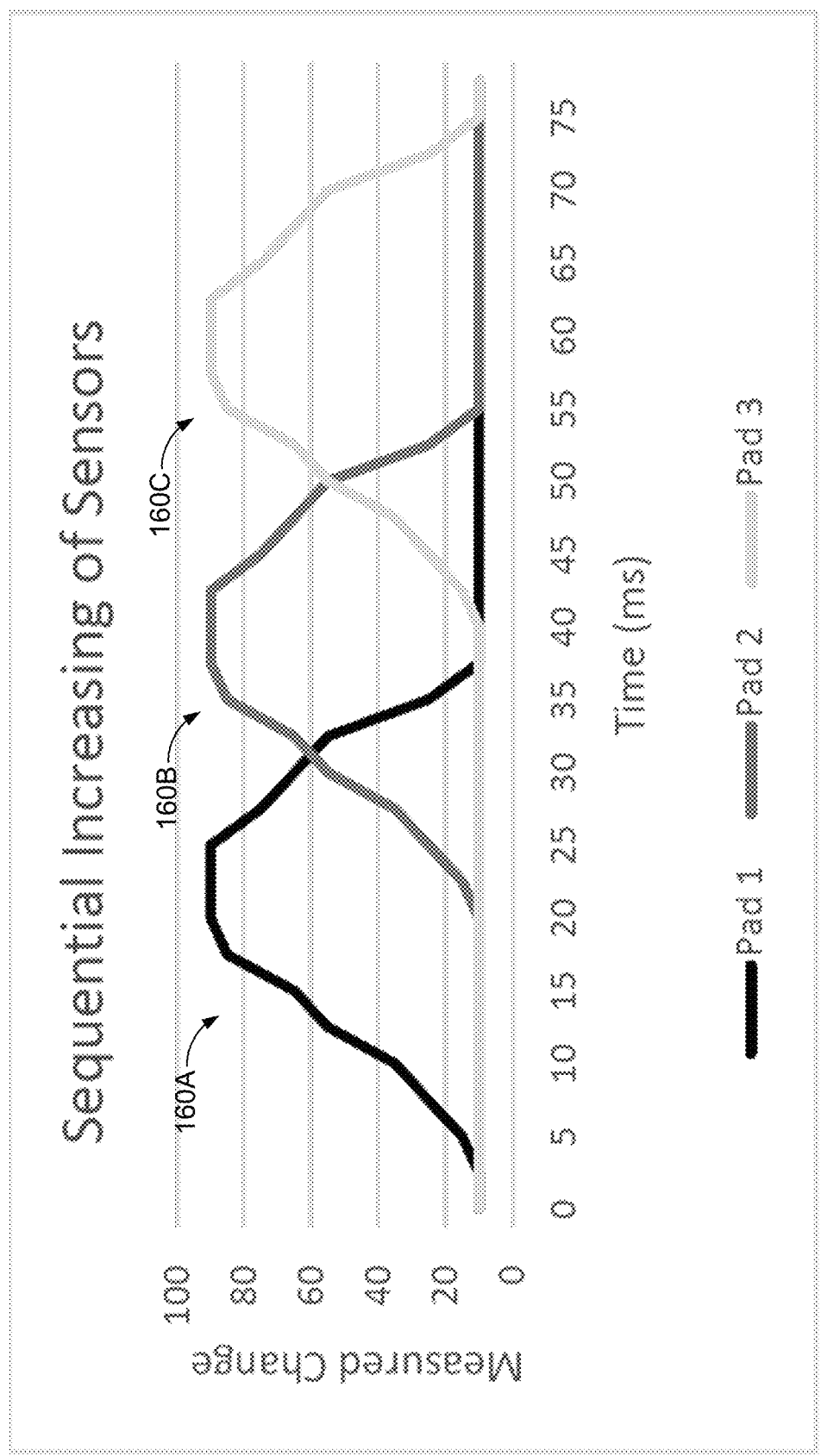
FIG. 16 shows a plot of capacitance of three touch pad sensors over time.

Alternatively or additionally, the system may determine that the user has performed a swipe gesture based on monitoring touch values increasing sequentially along the touch pads or sensors in a linear direction. The change in voltage on a charge pump circuit associated with each touch pad may be an indicator of an approaching finger. As a finger slides across the sequential pads, the charge increases and then decreases as the finger moves past the touch pad. For example, as shown in FIG. 16, a plot 160A of a first pad shows an increase in charge and then a decrease in charge. As the first plot 160A is decreasing, a plot 160B of a second pad begins to increase in charge. As the plot 160B is decreasing, a plot 160B of a third pad begins to increase in charge. These plots are representative of a user performing a swipe gesture beginning at the first pad, passing through the second pad, and ending at the third pad. The system may monitor such charge patterns to determine the direction and magnitude of a swipe gestured performed by a user.

Figure 17A:
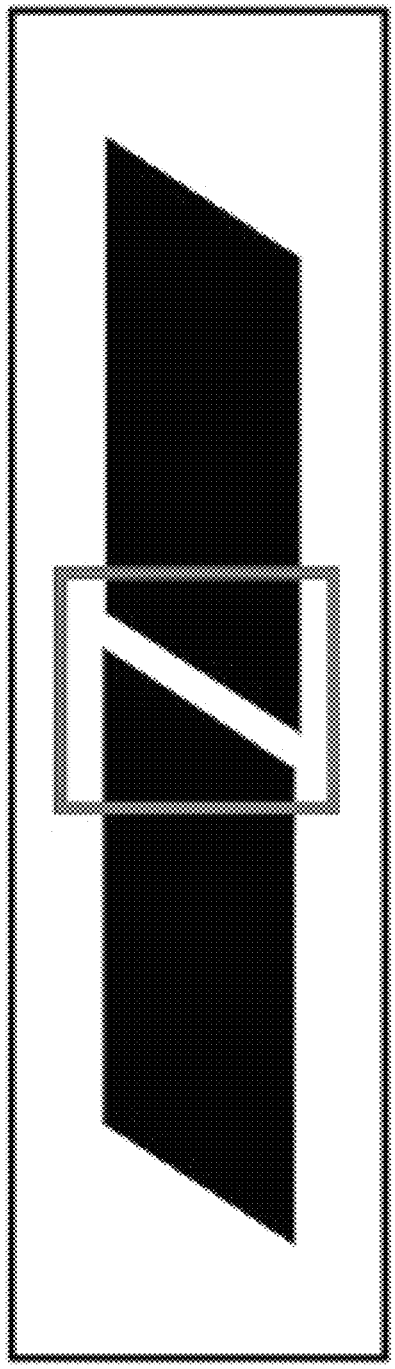
FIGS. 17A and 17B show two touch pads interleaved.
Figure 17B:
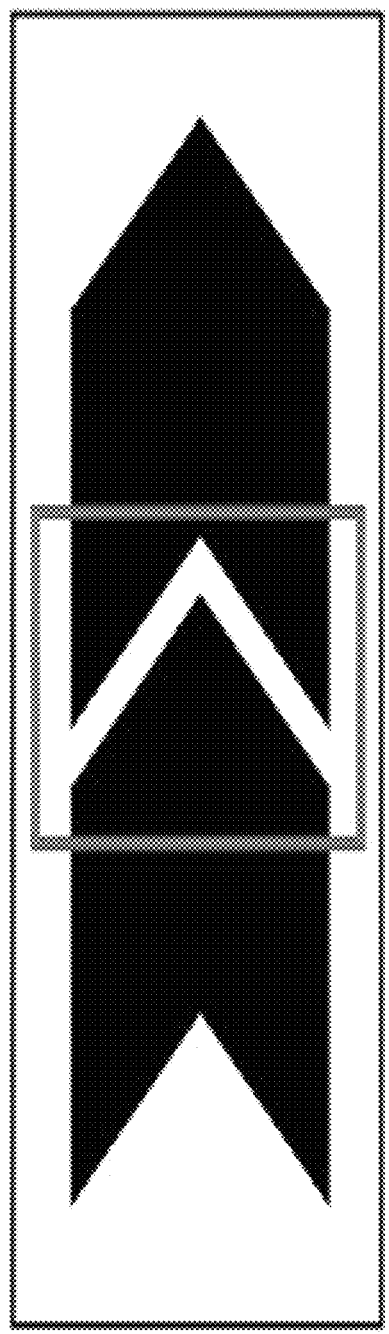
Figure 18A:
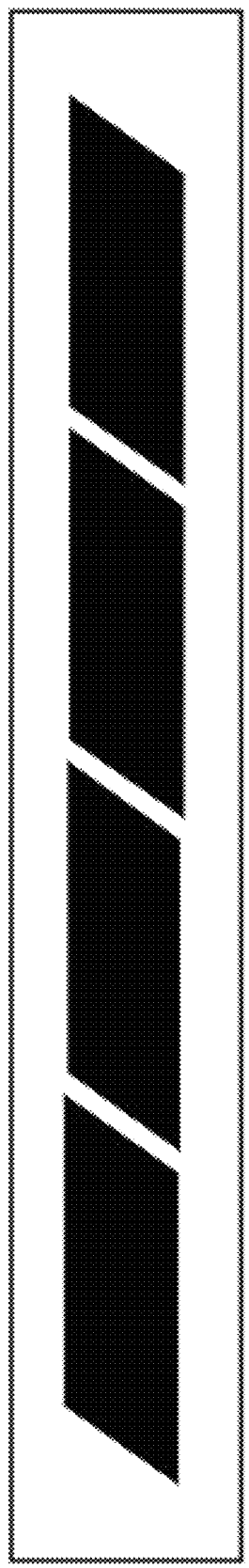
FIGS. 18A and 18B show four touch pads interleaved.
Figure 18B:
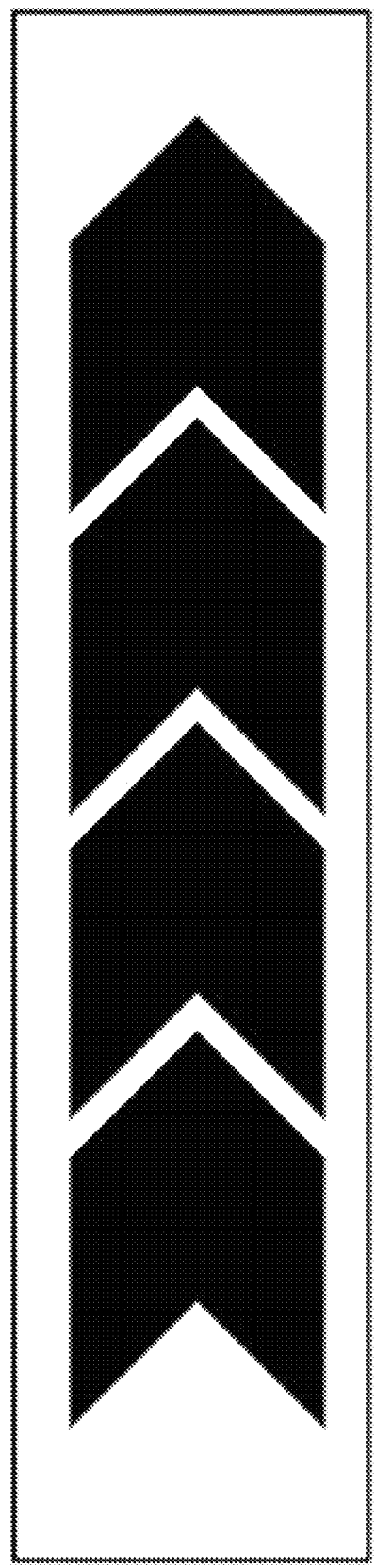

Referring now to FIGS. 17A and 17B, the system may also detect a swipe gesture based on using two or more at least partially interleaved or overlapping sensors as a slider. That is, the sensors at least partially overlap such that a user swiping along the sensors may touch a portion of both sensors simultaneously. The ratio of change in capacitance between the sensor pads may determine the swipe direction (e.g., left to right, right to left, etc.). The system may monitor the changing capacitance levels (e.g., via software executing on the ECU in communication with the sensors). Here, the touch sensors overlap by using an edge that is angled relative to the axis the user swipes along (FIGS. 17A and 17B) and by using "arrow-shaped" edges (FIGS. 17B and 18B), but any method of interleaving or overlapping may be used. The touch portion may include any number of interleaved sensors. For example, FIGS. 18A and 18B illustrate designs using four sensors each. The touch pads and/or touch regions may utilize aspects described in U.S. provisional application Ser. No. 63/261,304, filed on Sep. 17, 2021, which is hereby incorporated by reference in its entirety.

The door handle assembly is thus operable to open the vehicle door when a user grasps the door handle portion at the side of the vehicle door. The door handle assembly may also be operable in conjunction with a passive keyless entry or other sensing system that is operable to determine whether or not the person at the vehicle door is authorized for entry into the vehicle, and may only open the vehicle door when that system recognizes the user or key fob or transmitting device associated with the owner or authorized user of the vehicle. Optionally, the door handle assembly may be associated with or in communication with a door zone module, such as by utilizing aspects of the vehicle door systems described in U.S. Publication No. US-2010-0007463, which is hereby incorporated herein by reference in its entirety.

Optionally, the lighting module may comprise a strip light or pocket light or the like, and the door handle assembly may include a ground illumination light and/or other light or lighting element, such as a projection light or the like, such as by utilizing aspects of the door handle assemblies and lighting systems described in U.S. Pat. Nos. 5,371,659; 5,497,305; 5,669,699; 5,823,654; 6,349,450; 6,550,103; 8,786,401 and/or 8,801,245, and/or U.S. Publication Nos. US-2010-0088855 and/or US-2010-0007463, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular sensing system comprising:
 a sensing device disposed at a vehicle door of a vehicle equipped with the vehicular sensing system, the sensing device comprising a sensor element and at least one light emitting diode (LED) disposed at a circuit board;
 wherein the sensing device is disposed behind a panel of the vehicle door of the vehicle, with the sensor element and the at least one LED being disposed at a light transmitting portion of the panel of the vehicle door of the vehicle;
 a controller comprising circuitry, the circuitry comprising a processor operable to process sensor data captured by the sensor element;
 wherein the vehicular sensing system, responsive to processing at the controller of sensor data captured by the sensor element when the sensor element and the at least one LED are powered, determines a user gesture corresponding to a particular movement of a hand of a user relative to the sensing device;
 wherein the vehicular sensing system is operable to determine any one of a plurality of user gestures based on determination of one or more selected from the group consisting of (i) a particular location of the user's hand relative to the sensing device, (ii) swiping movement of the user's hand relative to the sensing device, (iii) circular movement of the user's hand relative to the sensing device, (iv) movement of the user's hand toward or away from the sensing device, and (v) a linger time of the user's hand at the particular location relative to the sensing device;
 wherein the vehicular sensing system, responsive to determining a particular user gesture of the plurality of user gestures, provides an output for at least one selected from the group consisting of (i) locking the vehicle door of the vehicle, (ii) unlocking the vehicle door, (iii) opening the vehicle door, (iv) opening or closing a window of the vehicle, (v) folding/unfolding powerfold mirrors of the vehicle, (vi) interfacing with HVAC functions of the vehicle, (vii) interfacing with infotainment functions of the vehicle, (viii) triggering a home garage door opener, (ix) activating/deactivating exterior lighting of the vehicle, (x) activating a car wash function of the vehicle and (xi) activating a panic mode of the vehicle; and
 a plurality of touch pads arranged to designate at least one touch region on a surface of the vehicle, wherein the vehicular sensing system is operable to detect, based on a user interaction with the at least one touch region, contact by the user with the at least one touch region, and wherein the vehicular sensing system, responsive to determining the contact, provides the output.

2. The vehicular sensing system of claim 1, wherein the vehicular sensing system determines the plurality of user gestures based on different combinations of at least two selected from the group consisting of (i) determined location of the user's hand relative to the sensing device, (ii) determined swiping movement of the user's hand relative to the sensing device, (iii) determined circular movement of the user's hand relative to the sensing device, (iv) determined movement of the user's hand toward or away from the sensing device, and/or (v) determined linger time of the user's hand at the particular location relative to the sensing device.

3. The vehicular sensing system of claim 1, wherein the vehicular sensing system determines the user gesture based on a combination of (a) at least one selected from the group consisting of (i) determined location of the user's hand relative to the sensing device, (ii) determined swiping movement of the user's hand relative to the sensing device and (iii) determined circular movement of the user's hand relative to the sensing device, and (b) determination of movement of the user's hand toward or away from the sensing device.

4. The vehicular sensing system of claim 1, wherein the controller is disposed at the vehicle door of the vehicle.

5. The vehicular sensing system of claim 1, wherein the controller is disposed at the sensing device.

6. The vehicular sensing system of claim 5, wherein the controller is disposed at the circuit board.

7. The vehicular sensing system of claim 1, wherein the plurality of touch pads comprises six touch pads.

8. The vehicular sensing system of claim 1, wherein the plurality of touch pads are linearly arranged along the surface of the vehicle.

9. The vehicular sensing system of claim 1, wherein the vehicular sensing system determines the contact is a swipe gesture, and wherein the vehicular sensing system determines a direction of the swipe gesture.

10. The vehicular sensing system of claim 9, wherein the vehicular sensing system determines the direction of the swipe gesture based on an order of activation of two or more of the plurality of touch pads.

11. The vehicular sensing system of claim 9, wherein the vehicular sensing system determines the direction of the swipe gesture based on a change in capacitance measured by each touch pad of the plurality of touch pads.

12. The vehicular sensing system of claim 9, wherein at least two of the plurality of touch pads are interleaved.

13. A vehicular sensing system comprising:
a sensing device disposed at a vehicle door of a vehicle equipped with the vehicular sensing system, the sensing device comprising a sensor element and at least one light emitting diode (LED) disposed at a circuit board;
wherein the sensing device is disposed behind a panel of the vehicle door of the vehicle, with the sensor element and the at least one LED being disposed at a light transmitting portion of the panel of the vehicle door of the vehicle;
a plurality of touch pads arranged to designate at least one touch region on a surface of the vehicle door of the vehicle;
a controller comprising circuitry, the circuitry comprising a processor operable to process sensor data captured by the sensor element and the plurality of touch pads;
wherein the vehicular sensing system, responsive to processing at the controller of sensor data captured by the sensor element when the sensor element and the at least one LED are powered, determines a user gesture corresponding to a particular movement of a hand of a user relative to the sensing device;
wherein the vehicular sensing system is operable to determine any one of a plurality of user gestures based on determination of one or more selected from the group consisting of (i) a particular location of the user's hand relative to the sensing device, (ii) swiping movement of the user's hand relative to the sensing device, (iii) circular movement of the user's hand relative to the sensing device, (iv) movement of the user's hand toward or away from the sensing device, and (v) a linger time of the user's hand at the particular location relative to the sensing device;
wherein the vehicular sensing system, responsive to determining a particular user gesture of the plurality of user gestures, provides an output for at least one selected from the group consisting of (i) locking the vehicle door of the vehicle, (ii) unlocking the vehicle door, (iii) opening the vehicle door, (iv) opening or closing a window of the vehicle, (v) folding/unfolding powerfold mirrors of the vehicle, (vi) interfacing with HVAC functions of the vehicle, (vii) interfacing with infotainment functions of the vehicle, (viii) triggering a home garage door opener, (ix) activating/deactivating exterior lighting of the vehicle, (x) activating a car wash function of the vehicle and (xi) activating a panic mode of the vehicle;
wherein the vehicular sensing system detects, based on a user interaction with the at least one touch region, contact by the user with the at least one touch region; and
wherein the vehicular sensing system, responsive to determining the contact, provides the output.

14. The vehicular sensing system of claim 13, wherein the vehicular sensing system determines the plurality of user gestures based on different combinations of at least two selected from the group consisting of (i) determined location of the user's hand relative to the sensing device, (ii) determined swiping movement of the user's hand relative to the sensing device, (iii) determined circular movement of the user's hand relative to the sensing device, (iv) determined movement of the user's hand toward or away from the sensing device, and/or (v) determined linger time of the user's hand at the particular location relative to the sensing device.

15. The vehicular sensing system of claim 13, wherein the vehicular sensing system determines the user gesture based on a combination of (a) at least one selected from the group consisting of (i) determined location of the user's hand relative to the sensing device, (ii) determined swiping movement of the user's hand relative to the sensing device and (iii) determined circular movement of the user's hand relative to the sensing device, and (b) determination of movement of the user's hand toward or away from the sensing device.

16. The vehicular sensing system of claim 13, wherein the vehicular sensing system determines the contact is a swipe gesture, and wherein the vehicular sensing system determines a direction of the swipe gesture.

17. The vehicular sensing system of claim 16, wherein the vehicular sensing system determines the direction of the swipe gesture based on an order of activation of two or more of the plurality of touch pads.

18. A vehicular sensing system comprising:
a sensing device disposed at a vehicle door of a vehicle equipped with the vehicular sensing system, the sensing device comprising a sensor element and at least one light emitting diode (LED) disposed at a circuit board;
wherein the sensing device is disposed behind a panel of the vehicle door of the vehicle, with the sensor element and the at least one LED being disposed at a light transmitting portion of the panel of the vehicle door of the vehicle;
a controller comprising circuitry, wherein the controller is disposed at the vehicle door of the vehicle, and wherein the circuitry comprises a processor operable to process sensor data captured by the sensor element;

wherein the vehicular sensing system, responsive to processing at the controller of sensor data captured by the sensor element when the sensor element and the at least one LED are powered, determines a user gesture corresponding to a particular movement of a hand of a user relative to the sensing device;

wherein the vehicular sensing system is operable to determine any one of a plurality of user gestures based on determination of (i) a particular location of the user's hand relative to the sensing device and (ii) one or more selected from the group consisting of (a) swiping movement of the user's hand relative to the sensing device, (b) circular movement of the user's hand relative to the sensing device, (c) movement of the user's hand toward or away from the sensing device, and (d) a linger time of the user's hand at the particular location relative to the sensing device;

wherein the vehicular sensing system, responsive to determining a particular user gesture of the plurality of user gestures, provides an output for at least one selected from the group consisting of (i) locking the vehicle door of the vehicle, (ii) unlocking the vehicle door, (iii) opening the vehicle door, (iv) opening or closing a window of the vehicle, (v) folding/unfolding powerfold mirrors of the vehicle, (vi) interfacing with HVAC functions of the vehicle, (vii) interfacing with infotainment functions of the vehicle, (viii) triggering a home garage door opener, (ix) activating/deactivating exterior lighting of the vehicle, (x) activating a car wash function of the vehicle and (xi) activating a panic mode of the vehicle; and a plurality of touch pads arranged to designate at least one touch region on a surface of the vehicle, wherein the vehicular sensing system is operable to detect, based on a user interaction with the at least one touch region, contact by the user with the at least one touch region, and wherein the vehicular sensing system, responsive to determining the contact, provides the output.

19. The vehicular sensing system of claim 18, wherein the controller is disposed at the sensing device.

* * * * *